United States Patent [19]

Ostermeyer

[11] Patent Number: 5,221,703

[45] Date of Patent: Jun. 22, 1993

[54] ENGINEERED MODIFIED ASPHALT CEMENT

[75] Inventor: Larry F. Ostermeyer, West Lafayette, Ind.

[73] Assignee: McConnaughay Technologies, Inc., Lafayette, Ind.

[21] Appl. No.: 883,110

[22] Filed: May 14, 1992

[51] Int. Cl.$^5$ .................... C08L 95/00; C08L 93/04
[52] U.S. Cl. ..................... 524/68; 524/62; 524/71; 524/270
[58] Field of Search ............. 524/68, 71, 62, 270

[56] References Cited

U.S. PATENT DOCUMENTS

| | | | |
|---|---|---|---|
| 2,789,917 | 4/1957 | Hardman | 107/277 |
| 2,855,319 | 10/1958 | McConnaughay | 106/123 |
| 3,036,015 | 5/1962 | Woodward | 252/331.5 |
| 3,110,604 | 11/1963 | McConnaughay | 106/277 |
| 3,556,827 | 1/1971 | McConnaughay | 106/279 |
| 3,607,773 | 9/1971 | Pitchford et al. | 252/311.5 |
| 3,867,162 | 2/1975 | Elste, Jr. | 106/277 |
| 3,904,428 | 9/1975 | McConnaughay | 106/278 |
| 4,209,337 | 6/1980 | Wagner et al. | 106/96 |
| 4,433,084 | 2/1984 | Ostermeyer et al. | 524/62 |
| 4,479,827 | 10/1984 | Ward | 106/281 R |
| 4,874,432 | 10/1989 | Kriech et al. | 106/273 |
| 5,023,282 | 6/1991 | Neubert | 524/59 |

FOREIGN PATENT DOCUMENTS 1393732  5/1975  United Kingdom .

Primary Examiner—Paul R. Michl
Assistant Examiner—LaVonda R. DeWitt
Attorney, Agent, or Firm—Barnes & Thornburg

[57] ABSTRACT

Modified asphalt cements comprise asphalt cement, reacted tall oil, tall oil pitch, tall oil derivatives or mixtures of these, and polymers selected from block copolymers and latexes, both synthetic and natural. Methods of manufacturing include: blending a reacted tall oil-modified asphalt cement with a polymer-modified asphalt cement to obtain the desired properties; modifying an asphalt cement with a reacted tall oil, tall oil pitch, tall oil derivatives or mixture thereof, and then adding the selected polymer(s) to this tall oil-modified asphalt cement; modifying the asphalt cement with the selected polymer(s) and then adding the tall oil, tall oil pitch, tall oil derivatives and mixtures thereof and reacting with a strong base; and, adding the polymer(s), tall oil, tall oil pitch, tall oil derivatives and mixture thereof and the strong base all to the asphalt cement at or nearly at the same time.

7 Claims, No Drawings

ENGINEERED MODIFIED ASPHALT CEMENT

This invention relates generally to modified asphalt cements and particularly to those that have incorporated the properties of both the polymer-modified and the reacted tall oil-modified asphalt cements. The resulting modified asphalt cements have utility in the road and roofing industries.

There is considerable art on the combination of bituminous materials, such as asphalts, with tall oil, either to form modified bituminous materials, or in the process of forming bituminous material-in-water emulsions, or bituminous material-containing gels. There are, for example, the disclosures of: British patent specification 1,393,732 (modified bituminous materials); and, U.S. Pat. No. 2,789,917 (bituminous emulsions); U.S. Pat. No. 2,855,319 (bituminous emulsions); U.S. Pat. No. 3,036,015 (bituminous emulsions); U.S. Pat. No. 3,110,604 (bituminous emulsions); U.S. Pat. No. 3,556,827 (modified bituminous materials); U.S. Pat. No. 3,607,773 (bituminous emulsions); U.S. Pat. No. 3,867,162 (bituminous emulsions); U.S. Pat. No. 3,904,428 (bituminous material-containing gel); U.S. Pat. No. 4,209,337 (bituminous emulsions); U.S. Pat. No. 4,433,084 (bituminous emulsions); U.S. Pat. No. 4,479,827 (modified bituminous materials); and, U.S. Pat. No. 4,874,432 (bituminous material-containing gel). Some of these same references also disclose the use of polymers and copolymers. There are, for example, the disclosures of U.S. Pat. No. 3,110,604 (water soluble poly ethylene oxide polymers added to emulsions as dilatants); U.S. Pat. No. 4,209,337 (bituminous emulsion-coated dispersions of natural or synthetic rubbers or other polymers in cement); U.S. Pat. No. 4,433,084 (bituminous emulsions containing copolymers); and U.S. Pat. No. 4,479,827 (modified bituminous materials containing organopolysiloxanes).

It is generally accepted that both polymer modification and reacted tall oil modification decrease the temperature susceptibility of an asphalt cement. However, they differ in the degree of change for a given use level. They also differ in the way they affect other rheological properties such as softening point, ductility, flow, etc.

This invention provides a means to modify an asphalt to provide the desired properties for a particular use and conditions. As an example, the reacted tall oil modification has a much greater effect on high temperature stiffness (viscosity), softening point and resistance to flow, while its impact on ductility, particularly low temperature ductility, is adverse. By including in the formulation or blending of the tall oil-modified asphalt (an) elastomeric polymer(s) this adverse impact can be overcome. Table 1, Examples 2 (base asphalt), 5 (reacted tall oil modification of Example 2), 11 (polymer modification of Example 2), and 17 (reacted tall oil/polymer modification of Example 2) illustrates this concept.

As used herein tall oil means tall oil, tall oil pitch, tall oil derivatives, or mixtures of any two or more of these unless otherwise specifically stated.

According to one embodiment of the invention, an asphalt modified by reacted tall oil and another modified by a polymer are blended together in a ratio to yield the desired results for a given base asphalt and end use. The blending and each modification may be produced by stirring or milling or both. The amount of reacted tall oil and the amount(s) of polymer(s) required in these two independent modifications are dependent on the base asphalt, the tall oil, the polymer, the desired characteristics of the final blend, and the ratios of the constituents.

According to a second embodiment of the invention, an asphalt cement is first modified by reacting tall oil in the asphalt cement with a strong base such as sodium or potassium hydroxide. If the strong base is added in a concentrated aqueous solution, it is more efficient than adding a dry base and then water to start the reaction. The selected polymer(s) is (are) then added to the tall oil-modified asphalt.

According to a third embodiment of the invention, reacted tall oil is added to a prior polymer-modified asphalt or tall oil is reacted in the polymer-modified asphalt with a strong base.

According to a fourth embodiment of the invention, tall oil, a strong base, and (a) polymer(s) are added to an asphalt cement simultaneously or substantially simultaneously. This blend is subjected to shear by a colloid mill or mixer, or both, to assist in the reaction and incorporation of the materials into the asphalt cement. If the polymer(s) selected is (are) in the form of (a) latex(es), the water in the latex(es) may be used to start the reaction of the tall oil and strong base.

The tall oil in the final blended modified asphalt is about 0.4% to about 10%, based on the total weight of the modified asphalt cement. The strong base, normally sodium hydroxide or potassium hydroxide to react with the tall oil, is in the range of 0.012% to about 2.4% based on the total weight of the modified asphalt cement. The range allows for the requirements of the different tall oil. For example, tall oil pitch requires about 3% sodium hydroxide, based on the weight of the tall oil, to form a suitable modifier. Distilled tall oil requires about 16% sodium hydroxide or 24% potassium hydroxide, based on the weight of the tall oil, to form a suitable modifier. The polymer(s) in the final blended modified asphalt is (are) in the range of 0.5% to about 5.0%, based on the total weight of the modified asphalt cement. If the polymer is in the form of (a) latex(es), for example, 9.0% liquid latex may be required to achieve the 5.0% polymer in the modified asphalt cement, owing to the other constituents of liquid latex(es), chiefly water.

Tables 1 and 2 illustrate the test results for forty-eight Examples. Table 1 contains the results for 31 Examples, where the neat (unmodified) asphalts, tall oil-modified asphalts, polymer-modified asphalts, and tall oil/polymer-modified asphalts are compared. Table 2 evaluates the effects of methods of manufacturing and varied use levels. Eight standard tests were conducted to compare the properties of asphalts modified by the different treatments. The tests are:

1. Penetration (ASTM D-5) at 4° C. This test is an indicator of relative stiffness or hardness of an asphalt cement at low temperature. This, with a stiffness value at a higher temperature such as penetration at 25° C. provides an indication of the temperature susceptibility of asphalt cements.

2. Penetration (ASTM D-5) at 25° C. This test is an indicator of relative stiffness or hardness of an asphalt cement at moderate temperature. Penetration at 25° C. is also specified in ASTM specifications for asphalt cement (D-946 Specification for Penetration-Graded Asphalt Cement for use in Pavement Construction and D-3381 Specification for Viscosity-Graded Asphalt for Use in Pavement Construction). Penetration at 25° C. is also required to calculate the pen-vis number (PVN) for the different samples so comparisons in terms of temperature susceptibility can readily be made.

3. Viscosity (ASTM D-4957) at 60° C. This test is used as an indicator of relative stiffness or hardness of an asphalt cement at the higher temperature at which a pavement might be expected to be subjected to. Viscosity is also used for specifications and the calculation of PVN.

4. Float Test (ASTM D-139) at 60° C. This test characterizes the flow behavior or in this case the resistance to flow under a low stress condition (25.4 mm of water) at 60° C.

5. Ductility (ASTM D-113) at 5 cm/min and 4° C. This test method provides one measure of tensile properties of bituminous materials at low temperature. It is also used to measure ductility for some polymer-modified asphalt cement specification requirements.

6. Softening Point (AASHTO T-53). Asphalt does not change from the solid state to the liquid state at any definite temperature, but gradually becomes softer and less viscous as the temperature rises. For this reason, the determination of softening point must be made by a fixed, arbitrary, and closely defined method if the results obtained are comparable. Softening point is indicative of the tendency of the asphalt to flow at elevated temperatures encountered in service. Softening point is also used in specifications for some polymer-modified and some reacted tall oil-modified asphalts.

7. Viscosity (ASTM D-4957) at 60° C. on residue from the Thin-Film Oven Test (ASTM D-1754). This method indicates approximate change in the viscosity of the asphalt during conventional hot mixing. It is used in asphalt specifications and is often considered as an indicator of an asphalt's comparative oxidation rate.

8. Ductility (ASTM D-113) at 5 cm/min. and 4° C. on residue from the Thin-Film Oven Test (ASTM D-1754). This method indicates approximate change in the ductility of the asphalt during conventional hot mixing. The greater the retained ductility after TFOT, the better the asphalt should perform. Since the measurements are at 4° C., the inference is for low temperature performance.

For Comparative values of temperature susceptibility (dependency) PVN (25°-60° C.) was determined instead of PI or PVN (25°-135° C.). While PVN (25°-60° C.) does not produce as great a difference between samples, it was determined, since many of the performance problems associated with temperature susceptibility occur within the 25° C. to 60° C. range. Also, both the PI and PVN (25°-135° C.) may yield misleadingly good measures of the temperature susceptibilities for the modified materials being tested.

The following two Tables illustrate test results for 48 Examples (31 Examples in Table 1 and 17 Examples in Table 2) performed to illustrate the capabilities of th invention.

The column headings in the Tables are as follows:
1. Example number
2. Source and grade of asphalt
3. Type of modification: O=no modification; T=reacted tall oil; P( )=polymer(type) modification; and, TP=reacted tall oil and polymer(type) modification.
4. Pen @4° C.—The Penetration of Bituminous Materials (ASTM D-5).
5. Pen @25° C.—The Penetration of Bituminous Materials (ASTM D-5).
6. Vis. @60° C.—Apparent Viscosity of Asphalt Emulsion Residue and Non-Newtonian Bitumens by Vacuum Capillary Viscometer (ASTM D-4957).
7. PVN (25°-60° C.)—Pen-Vis Number calculated by the following formula:

$$PVN (25-60° C.) = \frac{(6.489 - 1.590 \log P - \log V)}{(1.050 - 0.2234 \log P)} (-1.5)$$

Where P=penetration at 25° C., dmm
V=viscosity at 60° C., poise

The PVN is an indication of the slope of the viscosity temperature relationship measured between 25° C. and 60° C. The lower the PVN the greater the temperature susceptibility of the asphalt. For example, an asphalt with a PVN of +0.2 is more desirable than an asphalt with a PVN of −0.2 in terms of temperature susceptibility. A low PVN (e.g., −1.3 ) indicates a very temperature susceptible asphalt (not desirable).

8. Float @60° C.—Float Test for Bituminous Materials (ASTM D-139).
9. Duct. @5 cm/min 4° C.—Ductility of Bituminous Materials (ASTM D-113).
10. R & B—Softening Point of Asphalt (Bitumen) and Tar in Ethylene Glycol (Ring-and-Ball) (AASHTO T-53).
11. TFOT Res. Visc. @60° C.—Apparent Viscosity of Asphalt Emulsion Residue and Non-Newtonian Bitumens by Vacuum Capillary Viscometer (ASTM D-4957) on the residue from Effect of Heat and Air on Asphaltic Materials (Thin-Film Oven Test) (ASTM D-1754).
12. Vis. Increase %—Calculated percent of increase in viscosity due to the Thin-Film Oven Test (ASTM D-1754).
13. TFOT Res. Duct. @4° C.—Ductility of Bituminous Materials (ASTM D-113) on the residue from Thin-Film Oven Test (ASTM D-1754).

Examples 1–4 are neat (unmodified) asphalt sample controls. Examples 2–4 were used as the base asphalts for the different modifications.

Examples 5–7 are prior art, reacted tall oil modifications of the asphalts of examples 2–4, respectively. In each case, 2% tall oil, based on the weight of asphalt and the tall oil, was reacted with 12.5% sodium hydroxide, based on the weight of the tall oil. In each case, it is evident that the viscosity at 60° C. was greatly increased (desirable), associated with some hardening of the penetration at 25° C., but still yielding improved pen-vis numbers. Other improved properties are higher resistance to flow, higher softening points and reduced oxidation. Properties that indicate no improvement, and in some cases losses, are penetration at 4° C. and ductility at 4° C.

Examples 8–13 are examples of prior art, polymer-modified asphalts with the base asphalts being those of Examples 2–4. Examples 8–10 are modifications of neat asphalts, Examples 2–4, respectively, with 2% SBS (styrene-butadiene-styrene block copolymer), based on the weight of asphalt. Examples 11–13 are modifications of the same neat asphalts and at the same 2% solid weight level, but the polymer used was SBR (styrene-butadiene rubber) in the form of a synthetic rubber latex. These polymer modifications did improve the low temperature ductility over that of the reacted tall oilmodified asphalt and, to a lesser degree, over the neat asphalts. They also improved (raised) the low temperature penetration over that of the respective reacted tall oil samples and at the same time increased the high temperature viscosity (Vis @60° C.) over that of the neat asphalts, but not to the same degree as the reacted tall oil modification. Using these particular neat asphalts, SBR modification was more efficient than SBS modification. This may not hold true with other neat asphalts. Also in each modification (reacted tall oil, SBS, and SBR), the PVN is greater than the PVNs of the neat asphalts, indicating reduced temperature susceptibility, although not to the same degree for each type of modification.

Examples 14-19 are examples of the invention. Each is a 50/50 blend of a reacted tall oil-modified neat asphalt (Examples 5-6) and a respective polymer-modified neat asphalt (Examples 8-13). The resulting blends all have 1% reacted tall oil and 1% of either SBS or SBR, based on the weight of the asphalt. As an example of the 50/50 blends: using Ashland AC-5, Example 15 employs Example 6's 500 g AC-5, and 10 g reacted tall oil, and Example 9's 500 g AC-5, and 10 g SBS for a total of 1,000 g AC-5, 10 g reacted tall oil and 10 g SBS. All six Examples (14-19) demonstrate improvements in viscosity at 60° C., float, softening point, PVN and tests on residues from TFOT over the neat asphalts used as the base asphalts, not always to the same degree as the 2% reacted tall oil-modified Examples (5-7), but higher than the 2% polymer-modified Examples (8-13); without the detrimental effects to low temperature ductility that occur with the reacted tall oil modifications (Examples 5-7).

Examples 20-25 are prior art polymer modifications using polymers other than SBS and SBR. Each is added at the 2% level, based on the weight of the asphalt (2% solids when latex is the polymer). The neat asphalt used as the base asphalt in each case is Marathon AC-10 (from Example 2).

In Example 20, the polymer is a styrene-butadiene diblock copolymer (SB). This modification increased the 60° C. viscosity and improved the PVN but did little else to improve the base asphalt, based upon the tests performed.

In Example 21, the polymer is a natural latex. This modification increased the 60° C. viscosity, softening point, resistance to flow and improved the PVN.

In Example 22, the polymer is an ethylene methyl acetate (EMA). This modification increased the 60° C. viscosity and improved the PVN, but did little else. It was expected to improve the low temperature flexibility (ductility), but it did not with this particular asphalt cement.

In Example 23, the polymer is a chloroprene (neoprene latex). This modification moderately increased the viscosity, the associated PVN and the softening point. There was a moderate loss in penetration and ductility.

In Example 24, the polymer is an ethylene vinyl acetate (EVA). This modification increased both the 60° C. viscosity and the 25° C. penetration, which none of the other modifications in Table 1 accomplished with this particular asphalt cement. The PVN was also improved due to the improvements in the penetration and viscosity.

In Example 25, the polymer is a styrene-isoprene-styrene copolymer (SIS). This modification increased the viscosity at 60° C., resistance to flow, PVN and ductility at 4° C., but no significant increase was exhibited in softening point with this asphalt cement.

Examples 26-31 are also examples of the invention. Each is a 50/50 blend of Example 5 (reacted tall oil-modified asphalt) and one of Examples 20-25 (polymer-modified asphalt). The resulting blends thus all have 1% reacted tall oil and 1% of the polymer of a respective Example 20-25. All six Examples 26-31 demonstrate increases in viscosity (60° C.) and softening point over both the neat asphalt (AC-10) and the polymer-modified asphalt, but not to the same degree as Example 5, the reacted tall oil-modified asphalt. However, Examples 26-31 do not possess the detrimental effects on penetration (25° C.) and ductility (4° C.) to the same degree as exhibited in the reacted tall oil-modified base asphalt of Example 5.

Example 32 is a viscosity graded AC-20 from the Exxon refinery in Bayonne, New Jersey. This asphalt cement was blended with an emulsion base from Exxon to form a base asphalt for subsequent modification.

Example 33 is the base asphalt used for all of the modifications in Table 2, except for Examples 33 and 43. It is a blend of Exxon emulsion base to obtain a base asphalt that possesses the characteristics of an AC-10.

Example 34 is a prior art reacted tall oilmodified asphalt wherein the strong base (sodium hydroxide) was added to the asphalt/tall oil blend in an aqueous solution. The modified asphalt includes 600g asphalt of Example 32 at 195°-205° C., 12 g tall oil (2% of the weight of the asphalt), and 2.1 g of a 70% solution of sodium hydroxide (15 g dry NaOH).

Example 35 was prepared in the same manner as Example 34, except that the strong base was added dry, then followed by some water to start the reaction: 600 g asphalt of Example 33; 12 g tall oil; 1.5 g NaOH (dry); 2 g water.

Example 36 is a prior art polymer-modified asphalt (Example 33) wherein the polymer is SBR in the form of a latex: 600 g asphalt of Example 33 at 175° C.; 17.6 g latex (12 g SBR).

Example 37 is a modified asphalt according to the invention manufactured by blending equal parts of Examples 34 and 36.

Example 38 is a modified asphalt according to the invention manufactured by first modifying the asphalt by reacting a tall oil product in the asphalt with a strong base and then modifying the reacted tall oil/asphalt with a polymer: 600 g asphalt of Example 33 6 g tall oil (1%, based on weight of asphalt); 1.5 g 50% solution of NaOH (0.75 g dry); after reaction has taken place, add 8.8 g latex (6 g SBR) (1% SBR, based on the weight of asphalt).

Example 39 is a modified asphalt according to the invention manufactured by adding to 600 g asphalt of Example 33; 6 g tall oil; 0.75 g dry NaOH; and 8.8 g latex (6 g SBR); and stirring. The water that initiates the reaction in this example is the water in the latex.

Example 40 is a modified asphalt made according to the invention by adding to 1200 g asphalt of Example 33; 12 g tall oil; 1.5 g dry NaOH; then milling is started (multi-pass by circulation) and, simultaneously, 17.6 g latex (12 g SBR) is added with milling. Again, the water that initiates the reaction is the water in the latex.

Example 41 is a modified asphalt made according to the invention by first modifying 600 g of the base asphalt of Example 33 with 8.8 g latex (6 g SBR polymer). The base asphalt/polymer mixture was then stirred until the water in the latex evaporated. Then 6 g tall oil and 1.5 g 50% NaOH solution (0.75 g dry NaOH) were added.

Example 42 is STYRELF 203, a control, polymer-modified asphalt purchased from Elf Asphalt, Inc., Warsaw, Ind.

Example 43 is a modified asphalt according to the invention made by modifying Example 42 with reacted tall oil: 600 g Example 42; 9 g tall oil (1.5% by weight of Example 42); 1.6 g 70% solution NaOH (1.1 g dry NaOH).

Example 44 is manufactured by adding all the ingredients to a vessel with stirring and immediately passing the combined ingredients through a colloid mill: 1200 g asphalt of Example 33; 12 g tall oil; 1.5 g dry NaOH; and, 17.6 g latex (12 g SBR). All of these ingredients are added with brief stirring, then subjected to one pass through a colloid mill, and then discharged into another vessel with stirring until substantially all of the water has evaporated from the modified material.

In Examples 45 through 48, all modified asphalt cements according to the invention, the amounts of the reacted tall oil and polymer were varied.

In Example 45, 600 g of the asphalt of Example was mixed with 3 g tall oil (0.5% by weight of the asphalt) reacted with 0.76 g 50% NaOH solution (0.38 g dry NaOH); 26.5 g latex (18 g SBR—3% by weight of the asphalt) was then added.

In Example 46, the same procedure was followed, but with 600 g asphalt of Example 33; 15 g tall oil (2.5% by weight of the asphalt); 3 g 50% NaOH solution (1.5 g dry NaOH); and 4.4 g latex (3 g SBR—0.5% by weight of the asphalt).

In Example 47, the same procedure was followed, but with 600 g asphalt of Example 33; 3 g tall oil (0.5% by weight of the asphalt); 1.06 g 50% KOH solution (0.5 g dry KOH); and 18 g SBS (3% by weight of the asphalt).

In Example 48, the same procedure was followed, but with 600 g asphalt of Example 33; 15 g tall oil (2.5% by weight of the asphalt); 5.4 g 50% solution KOH (2.7 g dry KOH); and 3 g SBS (0.5% by weight of the asphalt).

In Example 49, 600 g of the asphalt of Example 33 was mixed with 60 g (10% by weight of the asphalt) of tall oil pitch reacted with 6 g of a 50% solution NaOH (3 g dry NaOH); 17.1 g liquid latex (12 g SBR) was then added.

In Example 50, 600 g of the asphalt of Example 33 was mixed with 12 g tall oil pitch (2% by weight of the asphalt) reacted with 3.6 g of a 25% KOH solution (0.9 g dry KOH); 42.9 g liquid latex (30 g SBR) was then added.

Finally, in Example 51, 600 g of the asphalt of Example 33 was mixed with 2.4 g distilled tall oil (0.4% by weight of the asphalt) reacted with 4.3 g of a 10% NaOH solution (0.43 g dry NaOH); 42.9 g liquid latex (30 g SBR) was then added.

While comparing the neat base asphalt, prior art modifications of neat asphalts (polymer or reacted tall oil types), and the invention (engineered modified asphalt) provides some interesting insights, it is appropriate to appreciate the capability to engineer into the resulting modified asphalt the desired characteristics to perform satisfactorily under specific conditions of use. Some considerations which enter into the modified asphalt engineering process include:

The more open the bituminous mixture, the more important the resistance to flow characteristic of the asphalt;

The broader the temperature range to which the modified asphalt will be exposed and the closer it will be to the surface, the more important temperature susceptibility (dependency) becomes;

As the bituminous mixture becomes more open and/or closer to the surface, the aging characteristics of the asphalt become more important;

Increased ductility is normally viewed as the asphalt's ability to withstand greater pavement movement. Thus increased ductility becomes more important in pavements that are apt to be subjected to, for example, structural or temperature-related movement;

Heavier loadings and higher surface temperatures require greater asphalt stiffness in the higher temperature ranges (viscosity at 60° C. and softening point are often used to indicate high temperature stiffness).

The trend toward specifying asphalt cement as being developed by the West Coast Users/Producers group and the Strategic Highway Research Program (SHRP) makes the ability to tailor a modified asphalt cement to a particular application or problem all the more attractive. An example of how a modified asphalt can be designed is illustrated by the following hypothetical project:

| Climatic Condition | Hot/cold ($\simeq$32° C./$\simeq$−30° C.) | | | |
| Type | Open surface mixture | | | |
| Structure | Sound | | | |
| Traffic | Moderate | | | |

| Example | 32 | 34 | 36 | 37 | Hypothetical Asphalt Spec. |
|---|---|---|---|---|---|
| Viscosity, 60.1 sec$^{-1}$, P | 1865 | 4944 | 2750 | 4060 | >3000 |
| Penetration, 25° C., 100 g, 5 sec., dmn. | 78 | 84 | 90 | 87 | >80 |
| Penetration, 4° C., 200 g, 60 sec., dmn | 26 | 25 | 32 | 34 | >30 |
| Float Test, sec | 341 | >1200 | 521 | >1200 | >1200 |
| PVN, (25–60° C.) | −0.43 | .64 | .14 | .49 | >0.0 |
| Ductility, 4° C., cm | 4.5 | 5.5 | >100 | 80.5 | >50 |
| Softening Point, °C. | 48.8 | 57.0 | 52.2 | 57.8 | >55 |

TABLE 1

| EX. NO | ASPHALT SOURCE/GRADE | TYPE OF MOD. | PEN @ 4° C. | PEN @ 25° C. | VISC @ 60° C. | PVN 25-60° C. | FLOAT @ 60° C. | DUCT 4° C. 5 CM/MIN | R & B C | TFOT VISC 60° C. | TFOT VISC. % INCREASE | TFOT DUCT @ 4° C. |
|---|---|---|---|---|---|---|---|---|---|---|---|---|
| 1 | UNITED AC-20 | 0 | 24 | 67 | 2226 | −0.56 | 393 | 3.5 | 49.4 | 4295 | 92.9 | 0.5 |
| 2 | MARATHON AC-10 | 0 | 41 | 106 | 1087 | −0.58 | 268 | 23 | 45.6 | 2250 | 107 | 1 |
| 3 | ASHLAND AC-5 | 0 | 56 | 183 | 551 | −0.41 | 193 | >100 | 40 | 820 | 48.8 | 16 |
| 4 | AMOCO AC-2.5 | 0 | 88 | 256 | 290 | −0.58 | 150 | >100 | 39.4 | 620 | 113.8 | 21 |
| 5 | MARATHON AC-10 | T | 24 | 68 | 3830 | 0.02 | >1200 | 8 | 62.2 | 4580 | 19.6 | 5.5 |
| 6 | ASHLAND AC-5 | T | 27 | 121 | 2420 | 0.53 | >1200 | 21.5 | 62.8 | 3180 | 31.4 | 15 |
| 7 | AMOCO AC-2.5 | T | 48 | 168 | 1270 | 0.42 | >1200 | 73 | 53.9 | 1290 | 1.6 | 34.5 |
| 8 | MARATHON AC-10 | P (SBS) | 24 | 80 | 2425 | −0.19 | 487 | 25 | 50.6 | 4840 | 99.6 | 20.5 |
| 9 | ASHLAND AC-5 | P (SBS) | 36 | 126 | 1170 | −0.21 | 280 | >100 | 43.9 | 1780 | 52.1 | 73 |
| 10 | AMOCO AC-2.5 | P (SPS) | 60 | 180 | 715 | −0.13 | 216 | >100 | 42.8 | 1300 | 81.8 | 83.5 |
| 11 | MARATHON AC-10 | P (SBR) | 27 | 101 | 2870 | 0.39 | 349 | >100 | 52.2 | 3205 | 11.8 | >100 |
| 12 | ASHLAND AC-5 | 41 | 177 | 905 | 0.11 | 180 | >100 | 42.2 | 1160 | 28.2 | >100 | | |
| 13 | AMOCO AC-2.5 | P (SBR) | 62 | 211 | 760 | 0.25 | 119 | >100 | 45.6 | 1045 | 37.5 | >100 |
| 14 | MARATHON AC-10 | TP (SBS) | 26 | 74 | 3190 | −0.03 | >1200 | 19 | 51.7 | 3700 | 16 | 14 |
| 15 | ASHLAND AC-5 | TP (SBS) | 30 | 125 | 2110 | 0.44 | 238 | 59 | 48.3 | 2280 | 8.1 | 32 |
| 16 | AMOCO AC-2.5 | TP (SBS) | 48 | 185 | 845 | 0.12 | >1200 | >100 | 44.4 | 990 | 17.2 | 36.5 |
| 17 | MARATHON AC-10 | TP (SBR) | 24 | 83 | 3040 | 0.11 | >1200 | 39 | 53.3 | 3710 | 22 | 14 |
| 18 | ASHLAND AC-5 | TP (SBR) | 35 | 138 | 1515 | 0.25 | >1200 | >100 | 46.7 | 1485 | −2 | >100 |
| 19 | AMOCO AC-5 | TP (SBR) | 57 | 200 | 890 | 0.33 | >1200 | >100 | 45.6 | 910 | 2.2 | >100 |
| 20 | MARATHON AC-10 | P (SB) | 23 | 86 | 2070 | −0.24 | 239 | 9 | 46.7 | | | |
| 21 | MARATHON AC-10 | P (NAT) | 21 | 87 | 3050 | 0.19 | 505 | 9.5 | 50 | | | |
| 22 | MARATHON AC-10 | P (EMA) | 22 | 83 | 2470 | −0.11 | 238 | 11.5 | 46.7 | | | |
| 23 | MARATHON AC-10 | P (NEO) | 25 | 90 | 1810 | −0.3 | 553 | 11.5 | 50 | | | |
| 24 | MARATHON AC-10 | P (EVA) | 32 | 111 | 1510 | −0.15 | 284 | 15 | 45.6 | | | |
| 25 | MARATHON AC-10 | P (SIS) | 22 | 188 | 2520 | 0.01 | 527 | 43 | 46.7 | | | |
| 26 | MARATHON AC-10 | P (SB) | 22 | 82 | 2790 | 0 | >1200 | 8.5 | 52.2 | | | |
| 27 | MARATHON AC-10 | TP (NAT) | 20 | 79 | 3380 | 0.14 | >1200 | 7 | 52.8 | | | |
| 28 | MARATHON AC-10 | TP (EMA) | 21 | 85 | 2560 | −0.03 | >1200 | 9.5 | 52.8 | | | |
| 29 | MARATHON AC-10 | TP (EMA) | 22 | 84 | 2340 | −0.15 | >1200 | 8.2 | 52.2 | | | |
| 30 | MARATHON AC-10 | TP (NEO) | 23 | 90 | 2285 | −0.06 | >1200 | 16.5 | 53.3 | | | |
| 31 | MARATHON AC-10 | TP (SIS) | 24 | 83 | 2760 | −0.01 | >1200 | 17 | 53.3 | | | |

TABLE 2

| EX. NO. | ASPHALT SOURCE/GRADE | TYPE OF MOD. | PEN @ 4° C. | PEN @ 25° C. | VISC @ 60° C. | PVN 25-60° C. | FLOAT @ 60° C. | DUCT 4° C. 5 CM/MIN | R & B C |
|---|---|---|---|---|---|---|---|---|---|
| 32 | EXXON AC-20 | 0 | 26 | 78 | 1865 | −0.43 | 341 | | |
| 33 | ExxonAC20/base | 0 | 29 | 115 | 980 | −0.67 | 272 | | |
| 34 | " | T{wet{ | 25 | 84 | 4944 | 0.64 | >1200 | | |
| 35 | " | T{dry} | 32 | 85 | 2155 | −0.21 | >1200 | | |
| 36 | " | P{SBR} | 32 | 90 | 2750 | 0.14 | 521 | | |
| 37 | " | T P{SBR}M I | 34 | 87 | 4060 | 0.49 | >1200 | | |
| 38 | " | T P{SBR}M II | 31 | 86 | 3618 | 0.35 | 420 | | |
| 39 | " | T{dry}P{SBR} II | 34 | 92 | 1448 | −0.51 | 432 | | |
| 40 | " | Ex. 39 milled | 35 | 110 | 1530 | −0.15 | 821 | | |
| 41 | " | P{SBR}T MIII | 31 | 90 | 2780 | 0.15 | 265 | | |
| 42 | Styrelf 203 | 0 | 46 | 146 | 1410 | 0.27 | 270 | | |
| 43 | Styrelf 203 | T{wet} MIII | 41 | 100 | 3430 | 0.56 | >1200 | | |
| 44 | ExxonAC20/base | TP{SBR}dry MIV | 36 | 116 | 1497 | −0.08 | 646 | | |
| 45 | " | TP{SBR} MII | 26 | 84 | 4120 | 0.45 | >1200 | | |
| 46 | " | TP{SBR} MII | 24 | 80 | 4759 | 0.51 | >1200 | | |
| 47 | " | TP{SBR} MII | 23 | 76 | 3494 | 0.11 | 515 | | |
| 48 | " | TP{SBR} MII | 22 | 68 | 6162 | 0.5 | >1200 | | |
| 49 | " | TP(SBR) MII | 27 | 85 | 3985 | 0.43 | 1200 | 27 | 61.1 |
| 50 | " | TP(SBR) MII | 23 | 67 | 4270 | 0.10 | 1200 | 50.5 | 73.9 |
| 51 | " | TP(SBR) MII | 24 | 69 | 4655 | 0.24 | 1200 | 47 | 75.6 |

What is claimed is:

1. A modified bituminous material consisting essentially of, by weight of the modified bituminous material, from about 82.6% to about 99.1% bituminous material, from about 0.4% to about 10% tall oil, from about 0.5% to about 5% polymer, and from about 0.015% to about 2.4% of a strong base.

2. The modified bituminous material of claim 1 wherein the polymer is a block copolymer.

3. The modified bituminous material of claim 2 wherein the block copolymer is selected from the group consisting of styrene-isoprene-styrene and styrene-butadiene-styrene block and styrene-butadiene diblock copolymers.

4. The modified bituminous material of claim 1 wherein the polymer is one or a mixture of more than one of styrene-butadiene-styrene block copolymer, styrene-butadiene rubber, styrene-butadiene diblock copolymer, natural latex, ethylene methyl acetate, chloroprenes, ethylene vinyl acetate, and styrene-isoprene-styrene block copolymer.

5. The modified bituminous material of claim 1 wherein the bituminous material is an asphalt cement.

6. The modified bituminous material of claim 1 wherein the strong base is selected from the group consisting of sodium hydroxide and potassium hydroxide.

7. The modified bituminous material of claim 6 wherein the strong base is added in the form of a water solution of the strong base.

* * * * *